United States Patent
Gershnik (10) Patent No.: US 9,535,895 B2
(45) Date of Patent: Jan. 3, 2017

(54) N-GRAM-BASED LANGUAGE PREDICTION

(75) Inventor: Eugene Gershnik, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 855 days.

(21) Appl. No.: 13/050,726

(22) Filed: Mar. 17, 2011

(65) Prior Publication Data

US 2012/0239379 A1 Sep. 20, 2012

(51) Int. Cl.
| | |
|---|---|
| G06F 17/20 | (2006.01) |
| G06F 17/27 | (2006.01) |
| G10L 15/00 | (2013.01) |
| G10L 15/28 | (2013.01) |
| G10L 13/00 | (2006.01) |
| G06F 17/21 | (2006.01) |
| G06F 9/44 | (2006.01) |
| G06K 9/72 | (2006.01) |

(52) U.S. Cl.
CPC .................. G06F 17/275 (2013.01)

(58) Field of Classification Search
USPC ............ 704/235, 8, 9, 3, 240, 2, 260, 1, 12, 255,704/10; 706/12, 52; 435/6.11; 382/230, 229
See application file for complete search history.

(56) References Cited

U.S. PATENT DOCUMENTS

| | | | | |
|---|---|---|---|---|
| 6,157,905 A | * | 12/2000 | Powell | 704/2 |
| 6,167,369 A | * | 12/2000 | Schulze | 704/9 |
| 6,216,102 B1 | * | 4/2001 | Martino | G06F 17/2715 704/1 |
| 7,035,801 B2 | * | 4/2006 | Jimenez-Feltstrom | G10L 13/08 704/255 |
| 7,139,697 B2 | * | 11/2006 | Hakkinen | G06F 17/2715 704/8 |
| 7,191,116 B2 | * | 3/2007 | Alpha | G06F 17/275 704/10 |
| 7,359,851 B2 | * | 4/2008 | Tong | G06F 17/218 704/8 |
| 7,552,045 B2 | * | 6/2009 | Barliga | G06F 17/275 704/1 |
| 7,689,409 B2 | * | 3/2010 | Heinecke | G06F 17/2715 382/229 |
| 7,818,165 B2 | * | 10/2010 | Carlgren | G06F 17/275 704/1 |
| 7,865,355 B2 | * | 1/2011 | Xu | G06F 17/275 704/8 |

(Continued)

OTHER PUBLICATIONS

Statistical Identification of Language by Ted Dunning, Computing Research Laboratory, New Mexico State University, 1994.*

(Continued)

*Primary Examiner* — Pierre-Louis Desir
*Assistant Examiner* — Neeraj Sharma
(74) *Attorney, Agent, or Firm* — Lee & Hayes, PLLC (57) ABSTRACT

Techniques are described for predicting the language of a text excerpt. The language prediction is accomplished by comparing n-grams of the text excerpt with n-grams of different language references. A probability is calculated for each n-gram of the text excerpt with respect to each of the language references. The calculated probabilities corresponding to a single language are then averaged to yield an overall probability corresponding to that language, and the resulting overall probabilities are compared to find the most likely language of the sample text.

23 Claims, 5 Drawing Sheets

(56) References Cited

U.S. PATENT DOCUMENTS

| | | | |
|---|---|---|---|
| 8,145,484 B2* | 3/2012 | Zweig | 704/240 |
| 8,468,011 B1* | 6/2013 | Sites | 704/8 |
| 8,600,730 B2* | 12/2013 | Aue | G06F 17/289 704/2 |
| 2006/0184357 A1* | 8/2006 | Ramsey | G06F 17/275 704/9 |
| 2006/0184460 A1* | 8/2006 | Cleary | 706/12 |
| 2006/0292610 A1* | 12/2006 | Shen et al. | 435/6 |
| 2007/0219777 A1* | 9/2007 | Chu et al. | 704/9 |
| 2009/0070094 A1* | 3/2009 | Best | G06F 17/289 704/2 |
| 2009/0132234 A1* | 5/2009 | Weikel | 704/3 |
| 2010/0125447 A1* | 5/2010 | Goswami | G06F 17/289 704/8 |
| 2010/0228549 A1* | 9/2010 | Herman et al. | 704/260 |
| 2010/0312545 A1* | 12/2010 | Sites | 704/8 |
| 2011/0071817 A1* | 3/2011 | Siivola | 704/8 |
| 2011/0172987 A1* | 7/2011 | Kent | G06F 17/241 704/3 |
| 2011/0246175 A1* | 10/2011 | Yi | G06F 17/2827 704/3 |

OTHER PUBLICATIONS

Ahmed, et al., "Language Identification from Text Using N-gram Based Cumulative Frequency Addition", Proceedings of Student/Faculty Research Day, CSIS, Pace Univeristy, May 7, 2004, pp. 12.1-12.8.

Cavnar, et al., "N-Gram-Based Text Categorization", Proceedings of SDAIR-94, 3rd Annual symposium on Document Analysis and Information Retrieval, 1994, 14 pages.

Grothe, et al., "A Comparative Study on Language Identification Methods", Proceedings of Language Resources and Evaluation Conference 2008, pp. 908-985.

Manning, et al., "Introduction to Information Retrieval", Cambridge University Press, Jul. 7, 2008, 569 pages.

Nather, "N-gram based Text Categorization", Diploma thesis, Comenius Univeristy, Bratislava, Slovakia, 2005, 38 pages.

Ranaivo-Malancon, "Automatic Identification of Close Languages—Case study: Malay and Indonesian", ECTI Transactions of Computer and Information Technology vol. 2, No. 2 Nov. 2006, pp. 126-134.

* cited by examiner

N-GRAM-BASED LANGUAGE PREDICTION

BACKGROUND

Many situations arise in which it is desired to programmatically determine the language (English, French, German, etc.) of a given sample text. One way to accomplish this is by comparing the sample text to reference texts of different languages.

In practice, such comparisons may be performed by first identifying n-grams of the sample text and of the reference texts, and by statistically comparing the n-grams. In general, an n-gram is an ordered sequence of data elements found in a larger sequence of data elements. With respect to text, an n-gram may be a sequence of n words or n characters, where n may be any integer larger than zero. In the context of language comparison, an n-gram is usually a sequence of characters. Thus, the n-grams of a particular text may include all possible substrings of size n that can be extracted from the text, including overlapping substrings. In some cases, the n-grams may be limited to characters that occur adjacently. In other cases, n-grams may include sequences in which the characters are found in a given sequence, but not necessarily adjacent to each other. Text is often normalized before identifying n-grams, such as by removing white space and punctuation, and by converting to a single case (uppercase or lowercase).

In order to determine the likelihood that a sample text corresponds to the language of a reference text, n-gram statistics for the sample text and the reference text can be calculated and compared. This can be done with respect to reference texts of multiple languages, in an attempt to determine which of the reference texts produces the best correspondence with the sample text.

Some methods of performing this analysis involve probability analysis. Specifically, when determining the likelihood that a sample text corresponds to the language of a reference text, each n-gram of the sample text is analyzed with respect to the reference text: for each n-gram, the analysis calculates the Bayesian probability that the n-gram might belong to the reference text. The calculated probabilities for multiple n-grams are then combined in some manner to indicate an overall probability of the sample text corresponding to the language of the reference text.

The Bayesian probability for an individual n-gram with respect to a particular language reference can be calculated in accordance with the conventional Bayesian formulation. In Bayesian terminology, the probability of a particular n-gram corresponding to a particular language reference is indicated symbolically as $P(A|B)$, where B represents the occurrence of the n-gram, A represents the result that the n-gram is of the given language, and $P(A|B)$ indicates the probability of A given B. $P(A|B)$ can be calculated by the following equation:

$$\frac{P(B|A)P(A)}{P(B)}$$

In this equation, $P(B|A)$ is the probability of B given A, which in this scenario is the probability or frequency with which the given n-gram occurs within the language reference, relative to other n-grams. For example, a particular n-gram may occur once in every 1000 n-grams of the reference, which may be represented as 0.001 or 0.1%.

$P(B)$ represents the probability or frequency with which the individual n-gram occurs within all of the available language references, relative to other n-grams. For example, a particular n-gram may occur once in every 10,000 n-grams when evaluated with respect to the n-grams of all available language references, which may be represented as 0.0001 or 0.01%.

$P(A)$ represents the probability, apart from any other factors, of any unknown n-gram being of a particular language. For many implementations, it may be assumed that every language has the same probability of occurrence, and this factor may therefore be removed or ignored for purposes of comparing between different languages. In other implementations, this factor may be a constant that is set for each individual language.

The process above results in a probability value for every n-gram of the sample text with respect to a reference language text. These calculated n-gram probabilities may be analyzed statistically to determine an overall likelihood that the sample text corresponds to the language of the reference language text. The overall likelihoods corresponding to different languages can then be compared to determine which language the sample text is mostly likely to represent.

Analyzing or combining the individual n-gram probabilities to create an overall evaluation of the sample text with respect to a particular reference text is typically accomplished by creating an ordered vector corresponding to the sample text, in which the vector contains all n-grams of the sample text in their order of probability. Similar vectors are created for the reference texts. A difference measurement is then calculated between the sample text vector and each of the reference text vectors, and the reference text having the smallest difference measurement is considered to represent the most likely language of the sample text. The difference measurements may be calculated in some embodiments as the edit distances between the sample text vector and the reference text vectors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes techniques that can be used to efficiently predict the language of a sample text. In accordance with certain embodiments, reference texts of different languages are analyzed by identifying the n-grams that occur within them and noting the frequencies with which the n-grams occur. The sample text is then analyzed to identify its n-grams, and a probability is calculated for each sample text n-gram with respect to each of the languages. Then, the n-gram probabilities corresponding to a single language are averaged to produce an overall probability for that language, indicating the relative likelihood of the sample text being of that language. The averages are compared, and the language corresponding to the highest average is judged to be the language of the sample text.

This technique is less complex and less computationally intense than prior methods of language detection, and is therefore appropriate for use in mobile devices, or other devices with limited processing resources. In spite of the lower complexity of the described techniques, they produce results that are comparable to previously used techniques. The described techniques are particularly effective when evaluating small sample texts, such as single phrases, sentences, or paragraphs.

The described language prediction techniques can be used in electronic book readers and other devices, in conjunction with word lookup functions and other language-dependent operations. Often, such devices are called upon to present electronic content of different languages, and there may be no ready mechanism for identifying the language of any given content item. This can be a problem in some situations, such as when attempting to look up a selected content word in a dictionary: the device will typically will need to know the language of the word in order to select an appropriate dictionary. The techniques described herein can be used to efficiently provide this determination.

Figure 1:
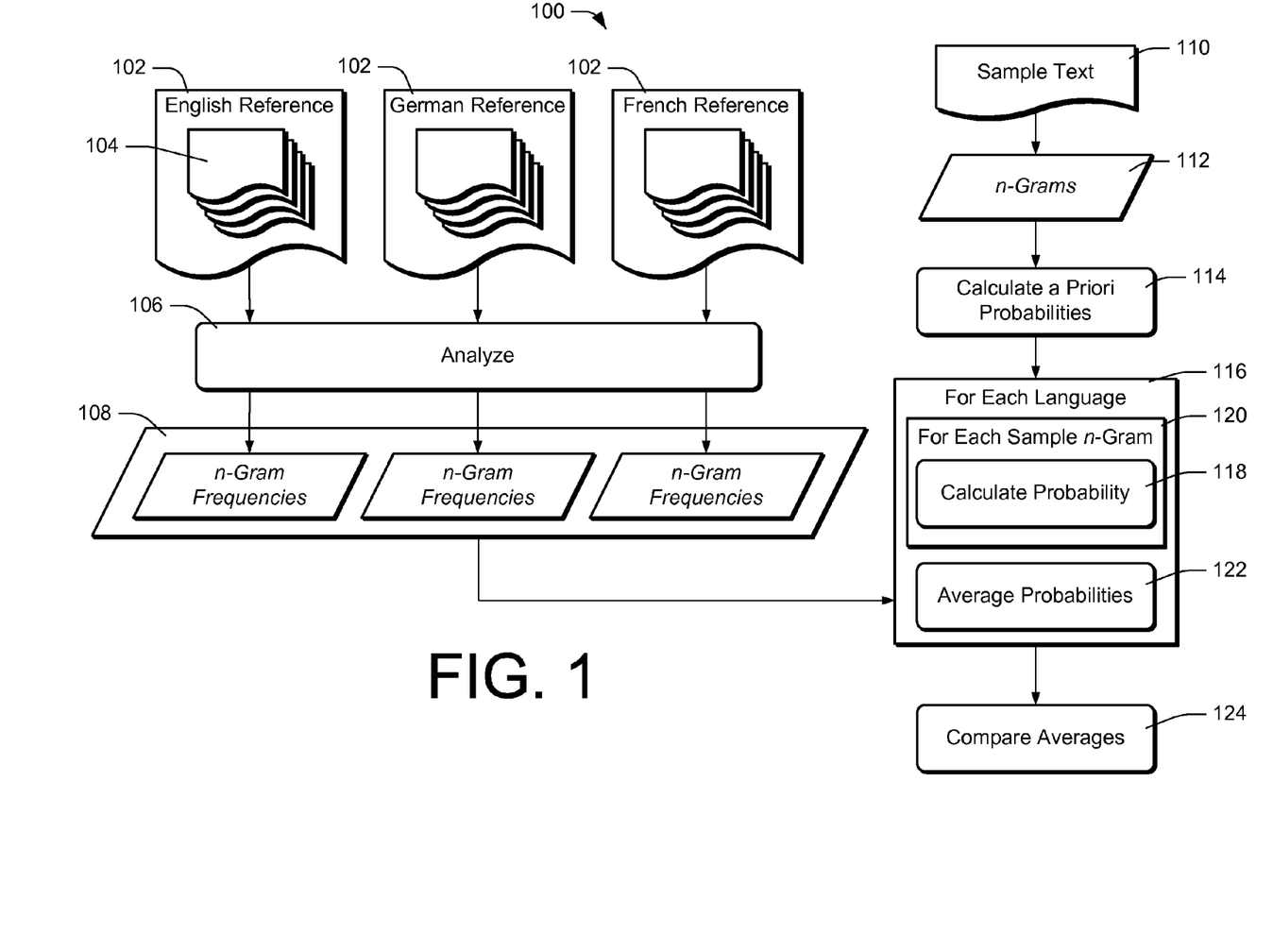
FIG. 1 is a block diagram illustrating an example process of determining the language of a sample text.

FIG. 1 illustrates a method 100 of predicting the language of a sample text. As a preparatory step, different language references are analyzed to identify the n-grams they contain and the frequencies with which they occur within the respective language references and within the overall collection of language references. Each language reference can be generally described as a sequence of individual characters.

Three language references 102 are illustrated in FIG. 1, corresponding to three different languages: English, German, and French. In actual implementation, fewer or more language references may be used, corresponding to fewer or more individual languages. Each language reference 102 may comprise one or more individual textual references or reference texts 104 of the corresponding language. Each language reference 102 may comprise, as an example, from one to ten megabytes of textual data, which has been normalized by removing white space and punctuation and by converting all characters to a common case (uppercase or lowercase). Spaces between words may be retained, or replaced by a special character such as an underscore. Paragraph separators may or may not be retained.

The language references 102 are analyzed in an action 106 to produce and store n-gram frequencies for the multiple languages, in one or more n-gram frequency tables 108. The frequency tables, which may be embodied as various types of data structures or objects, indicate or allow derivation of the frequencies of n-grams within the language references. More specifically, the frequency tables indicate n-gram data such as the following:

The n-grams that occur in each language reference 102.

For each n-gram, the relative frequency with which it appears in each of the individual language references 102.

For each n-gram, the relative frequency with which it appears in the combined collection of language references 102.

"Relative frequency" can be indicated as the percentage of the total n-grams that consist of the given n-gram. Thus, if a single language reference 102 contains 100,000 n-gram occurrences, and a particular n-gram makes up 500 of those occurrences, the frequency of that n-gram's occurrence in the single language reference 102 is 500/100,000, or 0.5%. If the combined collection of language references 102 contains 1,000,000 n-gram occurrences, and the n-gram comprises 750 of those occurrences, its frequency of occurrence within the combined collection is 750/1,000,000, or 0.075%.

The n-gram table(s) 108 can be stored for reference, to be used when evaluating various sample texts; the original language references 102 are not needed in subsequent operations. Furthermore, the n-gram table(s) 108 can be minimized by omitting data for n-grams that occur relatively infrequently. For example, n-grams that occur less than once in every 100,000 n-grams may be considered to be noise, and omitted from the n-gram table(s) 108.

To evaluate a sample text or sequence 110, the sample text or sequence is analyzed to identify the n-grams 112 that it contains. In some embodiments, an action 114 is performed, which comprises calculating a priori probabilities with respect to the sample text and each of the languages represented by the language references 102. One example of calculating a priori probabilities will be described with reference to FIG. 3. Note that the action 114 may or may not be performed in various embodiments: in some embodiments the a priori probabilities may be assumed to be equal for the different languages.

The actions within block 116 are then performed with respect to each of the available languages or language references 102 (which may comprise three language as shown, or may comprise many more languages).

For each given language, the action 118 within block 120 is performed with respect to every n-gram found within the sample text 110. The action 118 comprises calculating a probability that an individual n-gram of the sample text 110 corresponds to the given language reference, and thus to the language of the given language reference. After probabilities have been calculated for each of the n-grams, they are averaged at 122 to indicate an overall probability that the sample text is of the given language. This is repeated for every available language, to produce an overall probability corresponding to each language.

At 124, the overall probabilities are compared, and the language corresponding to the highest probability is deemed to be the language of the sample text 110.

At 118, calculating the probability that an individual n-gram of the sample text 110 corresponds to a particular language reference 102 may be performed based at least in part on the n-gram frequencies indicated by the n-gram table(s) 108.

Figure 2:
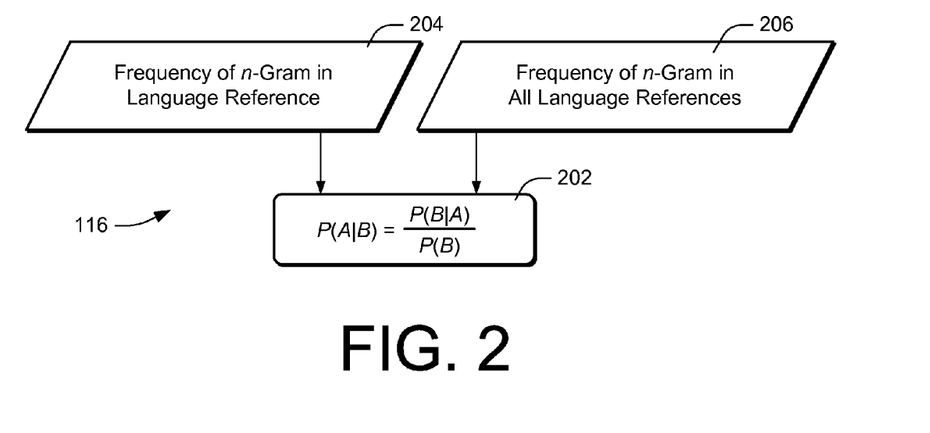
FIG. 2 is a flow diagram illustrating an example process of calculating a probability corresponding to a single n-gram with respect to a given language reference.

Specifically, as shown in FIG. 2, the probability may be based at least in part on the Bayesian probability $P(A|B)$, which can be calculated in an action 202 as:

$$\frac{P(B \mid A)}{P(B)}$$

where:
- P(B|A) is the frequency 204 with which the individual n-gram occurs within the particular language reference, relative to other n-grams; and
- P(B) is the frequency 206 with which the individual n-gram occurs within the language references of all available languages, relative to other n-grams.

The a priori probability P(A) of the conventional Bayesian formula is ignored in this embodiment and therefore assumed to be equal for each language. In some embodiments, the a priori probability P(A) may be chosen for each language, based on anticipated or known percentages of content items that are likely to occur in each of the languages.

Figure 3:
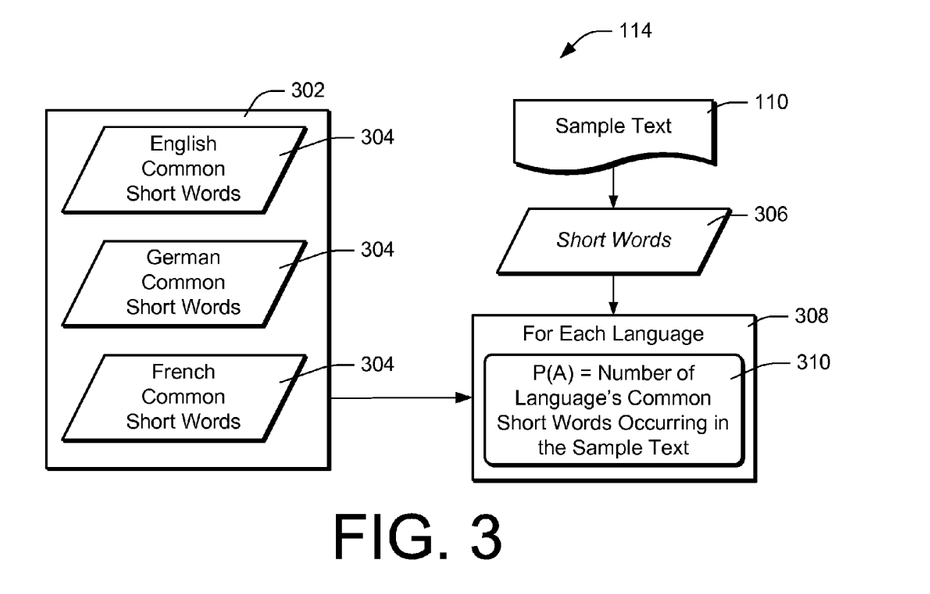
FIG. 3 is a flow diagram illustrating an example process of calculating a priori probability for different languages.

FIG. 3 shows an example of how the a priori probability P(A) for each language may be calculated in some embodiments. Based on the language references 102 (FIG. 1), word frequencies 302 are tabulated. More specifically, for each language, a list 304 of commonly occurring words in the corresponding language reference is compiled. In some embodiments, each list 304 is limited to relatively short words, such as words of four characters or less. Note that the word frequencies 302 may be calculated in a preparatory step, and stored for future use when analyzing specific sample texts.

The sample text 110 is also analyzed and a list 306 of short words occurring in the sample text is compiled or identified. At 308, for each language, an action 310 comprises determining the number of that language's short words (identified by lists 304) that occur in the sample text. This number, or a proportional number, is taken as the a priori probability P(A) for that language.

Figure 4:
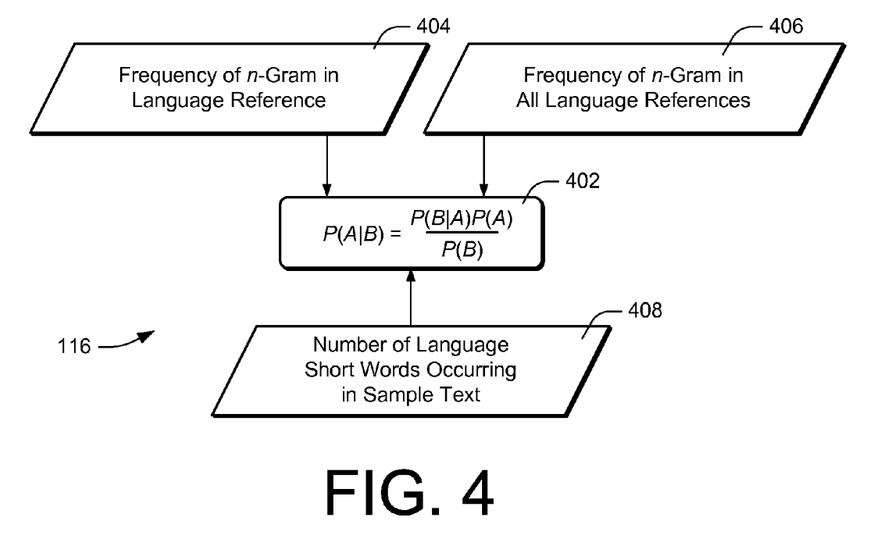
FIG. 4 is a flow diagram illustrating an alternative example process of calculating a probability corresponding to a single n-gram with respect to a given language reference.

FIG. 4 illustrates how the Bayesian probability P(A|B), can be calculated in conjunction with a priori probabilities. Specifically, Bayesian probability P(A|B) can be calculated in an action 402 as:

$$\frac{P(B \mid A)P(A)}{P(B)}$$

where:
- P(B|A) is the frequency 404 with which the individual n-gram occurs within the particular language reference, relative to other n-grams;
- P(B) is the frequency 406 with which the individual n-gram occurs within the language references of all available languages, relative to other n-grams; and
- P(A) is the number 408 of short words of the particular language that occur in the sample text.

Note that the a priori analysis can be limited to those languages using the same writing system as that of the sample text: the a priori probability can be assumed to be 0 for languages having a different writing system. Examples of writing systems include Latin, Cyrillic, Arabic, Hebrew, Kanji, and so forth.

In various embodiments, P(A) can be calculated in different ways. For example, with longer sample texts, it may be useful to consider the number of occurrences in the sample text of each short word of each language.

Figure 5:
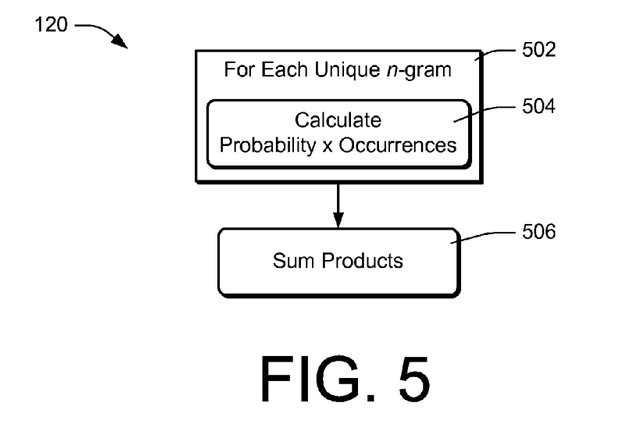
FIG. 5 is a flow diagram illustrating an example process of averaging individual n-gram probabilities corresponding to a given language reference.

The averaging 120 can be performed as illustrated in FIG. 5, in which block 502 represents iteration of an action 504 for each unique n-gram of the sample text. The action 604 comprises calculating the product of the n-gram's probability, as formulated above, and the number of occurrences of that n-gram. At 506, these products are summed to produce an overall probability corresponding to the sample text and one of the languages.

In the operations described above, an n-gram is a sub-sequence of individual data elements, taken from a larger sequence of such data elements. In the described context, the data elements comprise textual characters and the sub-sequences comprise textual strings or sub-strings, although the described techniques may be applicable in other contexts in which sub-sequences comprise different types of data elements. In the described embodiments, each n-gram comprises an ordered sequence of characters that occur contiguously or adjacently in the sample text. n-grams containing non-adjacent elements may also prove useful in some embodiments.

In the described embodiments, n may be equal to 3. In other words, the n-grams of the described embodiments comprise 3-grams or trigrams. The size n of the n-grams may be larger or smaller in various embodiments. Some embodiments may use multiple n-gram sizes.

Figure 6:
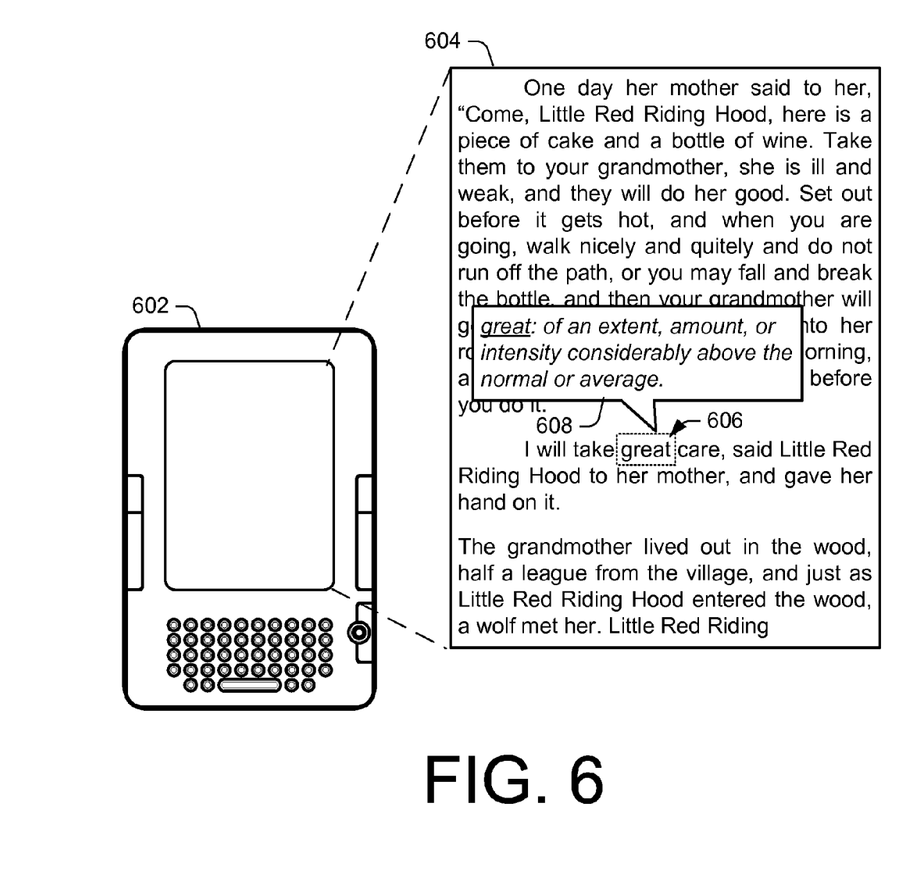
FIG. 6 is a diagram illustrating an example usage scenario for the process shown in FIG. 1.

FIG. 6 shows an illustrative user interface that enables a user to find the meaning of a selected word in the displayed text of an electronic book. Specifically, FIG. 6 shows an electronic reader device 602 and a screen example 604 that can be displayed by the electronic reader device 602. In this example, the user has selected the word "great", indicated by reference numeral 606. Various mechanisms can be used in different embodiments for selecting a word or other portions of displayed text, and might include touch-screen gestures or cursor manipulation in conjunction with buttons or other input devices. In some embodiments, the user may place a cursor at the beginning of the content that the user desires to select. A currently selected word or portion may be indicated by highlighting, such as by a rectangular selection indicator that surrounds the selected text, as shown in FIG. 6. Highlighting may alternatively be in the form of underling, color change, blinking text, and/or the like.

Once the user has selected a desired word (in this case the word "great"), the electronic reader device 602 may present a supplemental content area or overlay 608, with information about the selected word. In this case, the information comprises the meaning of the selected word.

Figure 7:
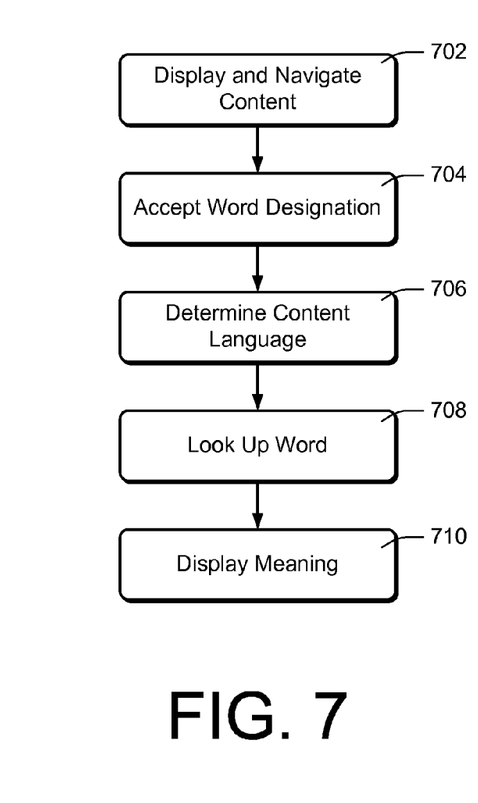
FIG. 7 is a flow diagram illustrating an example process for implementing the example usage scenario of FIG. 6.

FIG. 7 shows action that might be performed by the electronic reader device 602 to implement the functionality described with reference to FIG. 6. At 702, the electronic reader device 602 displays and navigates electronic content, in response to user input. At 704, the device 702 accepts designation of a word by a user, such as by allowing the user to move a cursor to a designated word that is displayed on the screen of the device. At 706, the reader device 602 determines the language of the content currently being displayed, using the techniques describe above with reference to FIG. 1. The n-gram frequencies 108, as well as the word frequencies 302 in some embodiments, may be previously stored on the reader device 602, to be referenced when calculating probabilities for individual n-grams. In other implementations, the n-gram frequencies and short word frequencies may be available from a remote source, or the language determination itself may be made by a remote service after submission of sample text to the remote service.

The language determination 706 may be based on the n-grams of the entire content item of which the designated word is a part. Alternatively, the determination may be based on n-grams from a portion of the content item, such as on an immediately preceding portion, an immediately subsequent portion, or a portion that surrounds the designated word. Thus, the language context of the designated word may be based on the line, sentence, paragraph, or chapter in which the word occurs, or on some other logical division of the content that contains the designated word.

Having determined the language of the content in which the designated word appears, an action 708 comprises looking up the word in a reference source such as a dictionary. Such a dictionary may be local to the device 602, or may be accessed from a remote source such as a website or web service.

An action 710 comprises displaying information related to the designated word, such as the meaning or definition of the word as obtained in action 708. This information may be displayed in various ways, or even enunciated audibly in some implementations.

Different systems and devices may utilize the described language prediction capabilities for different purposes. In addition to determining language for purposes of word lookup, there are other tasks performed by computers and other devices that depend on content language. Alphabetical title sorting, for example, has rules that may differ depending on language. In one language, for example, "de" may be an article that is ignored for purposes of alphabetization, even though the identical-appearing word may not be treated that way in another language.

Various types of text analytics may similarly have operational details and rules that vary depending on the language of the text being analyzed, and the described techniques may be useful in those environments.

Note also that the described techniques may be used in non-text scenarios, in which it is desired to classify a sample data or element sequence as corresponding to or arising from one of a plurality of different references, where n-grams of the sample data or element are statistically dependent.

Figure 8:
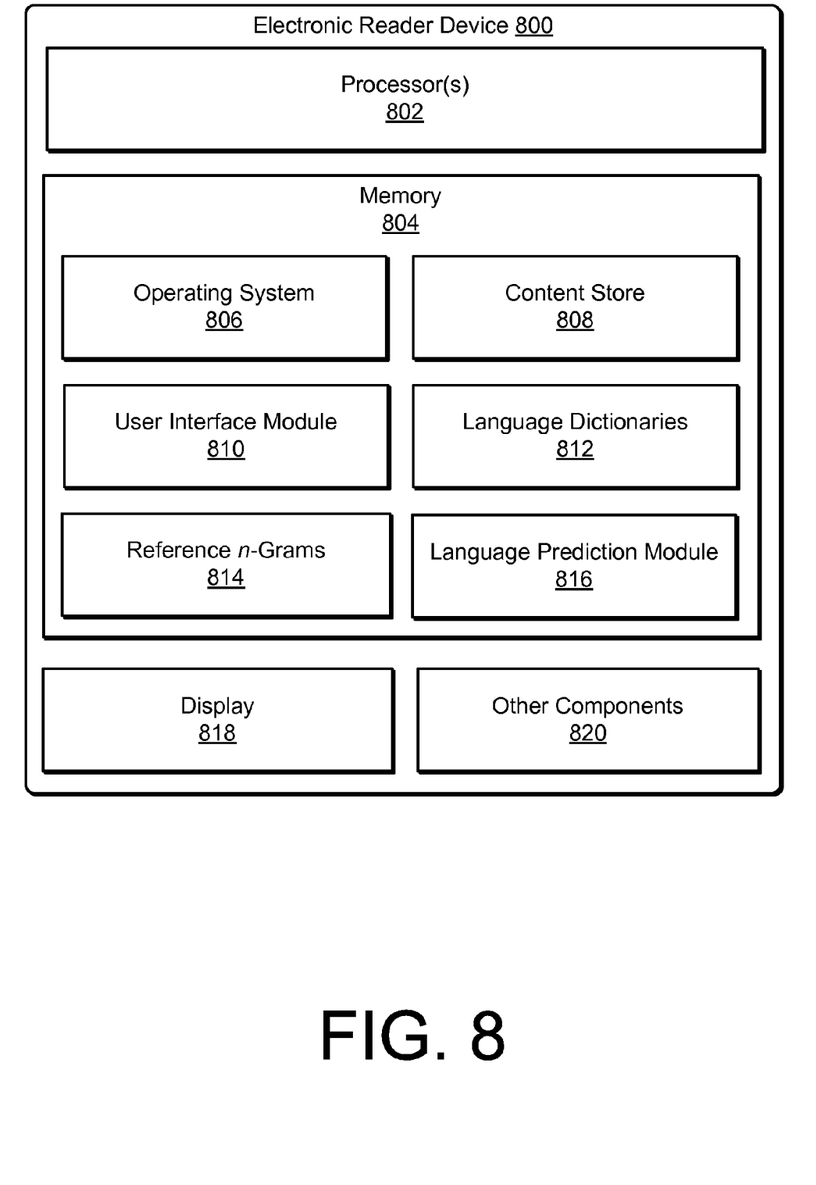
FIG. 8 is a block diagram of an electronic reader device that may be used to implement the techniques described herein.

FIG. 8 illustrates an example of a computer or computer-like device that may configured to perform the techniques described above. Specifically, FIG. 8 shows relevant components of an electronic reader device 600 that may benefit from the ability to determine the language of various content items.

The electronic reader device 800 may a dedicated eBook reader device, designed specifically for the purpose of emulating a traditional book-like reading experience. To that end, it may have a size and weight that is comparable to a paper-based book, and uses a display having a contrast ratio that approaches that of the printed page.

In a very basic configuration, the electronic reader device 800 includes a processing unit composed of one or more processors 802, and memory 804. Depending on the configuration of the electronic reader device 800, the memory 804 may be a type of computer storage media and may include volatile and nonvolatile memory. Thus, the memory 804 may include, but is not limited to, RAM, ROM, EEPROM, flash memory, or other memory technology, or any other medium which can be used to store media items or applications and data which can be accessed by the electronic reader device 600.

The memory 804 may be used to store any number of functional components that are executable on the processing unit 802. In many embodiments, these functional components comprise instructions or programs that are executable by the processing unit 802, and that implement operational logic for performing the actions described above. In addition, the memory 804 may store various types of data that are referenced by executable programs.

The memory 804 may store an operating system 806 and a content store 808 to contain one or more content items. A user interface module 810 may also be provided in the memory 804 and executed on the processing unit 802 to provide for user operation of the electronic reader device 800. The user interface module 810 may provide menus and other navigational tools to facilitate selection and rendering of content items, as well as navigation and selection of individual words.

A plurality of language dictionaries 812 may be stored within the memory 804, to be utilized in conjunction with the user interface module 810. Specifically, the language dictionaries 812 may allow the device 800 to look up the meanings or definitions of words in different languages.

Reference n-grams 814 may be stored within the memory 804 of the electronic reader device 800 to allow language prediction in accordance with the techniques described above. The reference n-grams 814 may comprise or be equivalent to the n-gram table(s) 108 (FIG. 1), and contain statistics regarding n-grams that occur in reference texts of different languages. The reference n-grams 814 may be calculated by the electronic reader device itself, or provided to the electronic reader device from another source.

A language prediction module 816 may also be stored in the memory 804 for execution by the processor 802. The language prediction module 816 may use the techniques described above to determine the language of any content item, or portion of any content item, that is maintained within the content store 808 or that is displayed by the device 800.

The electronic reader device 800 may further include a display or display surface 818 upon which electronic content is rendered. In one implementation, the display 818 may use electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display. Touch sensitive technology may be overlaid or integrated with the electronic paper display technology to enable user input via contact or proximity to the screen.

The electronic reader 800 may have additional features, functionality, and/or components 820. For example, the electronic reader 800 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. Thus, a server or other computer may be used to calculate and compile the n-gram table(s) 108, which might in turn be utilized by other devices as the basis for the further actions described herein.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. A computer-implemented method, comprising:
   under control of a device comprising one or more processors configured with executable instructions, receiving at a graphical user interface of the device, user selection of a sample electronic text;
   identifying multiple sample n-grams of the sample electronic text;
   for a first language:
   identifying a first set of n-grams that occur in a first language reference corresponding to the first language;
   calculating a first set of Bayesian probabilities, including calculating a first Bayesian probability based at least in part on a frequency of occurrence, in the first set of n-grams, of a first sample n-gram of the multiple sample n-grams; and
   calculating a first average of the first set of Bayesian probabilities;
   for a second language:
   identifying a second set of n-grams that occur in the second language reference corresponding to the second language;
   calculating a second set of Bayesian probabilities, including calculating a second Bayesian probability based at least in part on a frequency of occurrence, in the second set of n-grams, of a second sample n-gram of the multiple sample n-grams; and
   calculating a second average of the second set of Bayesian probabilities;
   comparing at least the first average and the second average;
   determine a language of the sample electronic text based at least in part on the comparing at least the first average and the second average;
   determining a meaning of a word of the sample electronic text in a dictionary of the language; and
   presenting the meaning of the word on a display of the device.

2. The computer-implemented method of claim 1, wherein calculating the first average of the first set of Bayesian probabilities comprises calculating a product of (a) the first Bayesian probability, and (b) a number of times the first sample n-gram occurs in the sample electronic text.

3. The computer-implemented method of claim 1, wherein each sample n-gram of the multiple sample n-grams is an ordered string of n characters.

4. The computer-implemented method of claim 1, wherein each sample n-gram of the multiple sample n-grams is a contiguous string of n characters, and n equals three.

5. The computer-implemented method of claim 1, wherein calculating the first Bayesian probability is based at least in part on:
   a first relative frequency with which the first sample n-gram occurs in the first set of n-grams; and
   a second relative frequency with which the first sample n-gram occurs in a combined collection of language references that include the first language reference and the second language reference.

6. The computer-implemented method of claim 1, wherein calculating the first Bayesian probability is based at least in part on:
   a first relative frequency with which the first sample n-gram occurs in the first set of n-grams;
   a second relative frequency with which the first sample n-gram occurs in a combined collection of language references that include the first language reference and the second language reference; and
   a number of short words of the first language that occur in the sample electronic text.

7. The computer-implemented method of claim 1, wherein calculating the first Bayesian probability comprises calculating the Bayesian probability P(A|B) of the first sample n-gram corresponding to the first language based at least in part on:

$$\frac{P(B \mid A)}{P(B)}$$

where:
P(B|A) is a first frequency with which the first sample n-gram occurs in the first set of n-grams, relative to other n-grams that occur in the first set of n-grams; and
P(B) is a second frequency with which the first sample n-gram occurs in a combined collection of language references that include the first language reference and the second language reference, relative to other n-grams that occur in the combined collection of language references.

8. The computer-implemented method of claim 1, wherein calculating the first Bayesian probability comprises calculating the Bayesian probability P(A|B) of the first sample n-gram corresponding to the first language based at least in part on:

$$\frac{P(B \mid A)P(A)}{P(B)}$$

where:
P(B|A) is a first frequency with which the first sample n-gram occurs in the first set of n-grams, relative to other n-grams that occur in the first set of n-grams;

P(B) is a second frequency with which the first sample n-gram occurs in a combined collection of language references that include the first language reference and the second language reference, relative to other n-grams that occur in the combined collection of language references; and P(A) is a number of short words of the first language that occur in the sample electronic text.

9. A computer-implemented method, comprising:
under control of a device comprising one or more processors configured with executable instructions, receiving at a graphical user interface of the device user selection of a sample electronic text;
identifying multiple sample n-grams of the sample electronic text;
for a first language:
calculating a first probability based at least in part on a frequency of occurrence, in the first language, of a first sample n-gram of the multiple n-grams;
calculating a second probability based at least in part on a frequency of occurrence, in the first language, of a second sample n-gram of the multiple n-grams;
generating a first average based at least in part on the first probability and the second probability;
for a second language:
calculating a third probability based at least in part on a frequency of occurrence, in the second language, of the first sample n-gram of the multiple sample n-grams;
calculating a fourth probability based at least in part on a frequency of occurrence, in the second language, of the second sample n-gram of the multiple n-grams;
generating a second average based at least in part on the third probability and the fourth probability;
determining a language of the sample electronic text based at least in part on comparing at least the first average and the second average;
displaying, via the graphical user interface, an indication of the language;
performing, via the device, a language-dependent operation based at least in part on the language of the sample electronic text; and
displaying, via the graphical user interface, information associated with the language-dependent operation.

10. The computer-implemented method of claim 9, wherein generating the first average comprises
calculating a first product of the first probability and a number of times the first sample n-gram occurs in the sample electronic text;
calculating a second product of the second probability and a number of times the second sample n-gram occurs in the sample electronic text; and
summing a set of calculated products that include the first product and the second product.

11. The computer-implemented method of claim 9, wherein a given n-gram of the multiple sample n-grams is an ordered string of n characters, and n equals three.

12. The computer-implemented method of claim 9, wherein calculating the first probability is based at least in part on relative occurrence frequencies of the first sample n-gram within reference texts of different languages.

13. The computer-implemented method of claim 9, wherein calculating the first probability comprises calculating a Bayesian probability of the first sample n-gram occurring in the first language.

14. The computer-implemented method of claim 9, wherein calculating the first probability comprises calculating a Bayesian probability $P(A|B)$ that the first sample n-gram corresponds to the first language based at least in part on:

$$\frac{P(B|A)}{P(B)}$$

where:
$P(B|A)$ is a first frequency with which the first sample n-gram occurs within the first language, relative to other n-grams that occur within the first language; and
$P(B)$ is a second frequency with which the first sample n-gram occurs within multiple languages, relative to other n-grams that occur within the multiple languages.

15. The computer-implemented method of claim 9, wherein calculating the first probability comprises calculating a Bayesian probability $P(A|B)$ that the first sample n-gram corresponds to the language based at least in part on:

$$\frac{P(B|A)P(A)}{P(B)}$$

where:
$P(B|A)$ is a first frequency with which the first sample n-gram occurs within the language, relative to other n-grams that occur within the first language;
$P(B)$ is a second frequency with which the first sample n-gram occurs within multiple languages, relative to other n-grams that occur within the multiple languages; and
$P(A)$ is a number of short words of the first language that occur in the sample electronic text.

16. An electronic book reader, comprising:
a display upon which to display electronic content of different languages;
one or more processors;
memory containing instructions that are executable by the one or more processors to perform actions comprising:
displaying electronic content on the display, the electronic content including text;
identifying multiple n-grams of at least a portion of the electronic content;
for a first language:
calculating a first probability based at least in part on a frequency of occurrence, in the first language, of a first sample n-gram of the multiple n-grams;
calculating a second probability based at least in part on a frequency of occurrence, in the first language, of a second sample n-gram of the multiple n-grams;
generating a first average based at least in part on the first probability and the second probability;
for a second language:
calculating a third probability based at least in part on a frequency of occurrence, in the second language, of the first sample n-gram of the multiple sample n-grams;
calculating a fourth probability based at least in part on a frequency of occurrence, in the second language, of the second sample n-gram of the multiple n-grams;
generating a second average based at least in part on the third probability and the fourth probability;

determining a language of the sample electronic text based at least in part on comparing at least the first average and the second average;

receiving designation of a first word within the electronic content;

looking up a meaning of the designated first word in a dictionary of the determined language; and presenting the meaning of the designated word to the user.

17. The electronic book reader of claim 16, wherein the at least a portion of the electronic content comprises text surrounding the designated first word.

18. The electronic book reader of claim 16, wherein the at least a portion of the electronic content comprises text adjacent to the designated first word.

19. The electronic book reader of claim 16, wherein the at least a portion of the electronic content comprises at least a paragraph that contains the designated first word.

20. The electronic book reader of claim 16, wherein the at least a portion of the electronic content comprises the text of the electronic content.

21. The computer-implemented method of claim 1, further comprising storing n-gram frequency data in an n-gram frequency table.

22. The computer-implemented method of claim 1, wherein the frequency of occurrence of the first sample n-gram is a percentage of a total number of all n-grams in the first language reference that consists of the first sample n-gram.

23. The electronic book reader of claim 16, wherein generating the first average comprises:

calculating a first product of the first probability and a number of times the first sample n-gram occurs in the electronic content;

calculating a second product of the second probability and a number of times the second sample n-gram occurs in the electronic content; and summing a set of calculated products that include the first product and the second product.

* * * * *